(12) United States Patent
Noh et al.

(10) Patent No.: US 10,490,809 B2
(45) Date of Patent: Nov. 26, 2019

(54) POSITIVE ELECTRODE ACTIVE MATERIAL FOR LITHIUM SECONDARY BATTERY

(71) Applicant: IUCF-HYU (INDUSTRY-UNIVERSITY COOPERATION FOUNDATION HANYANG UNIVERSITY), Seoul (KR)

(72) Inventors: Hyung-Joo Noh, Bucheon-si (KR); Yang-Kook Sun, Seoul (KR); Sung-June Youn, Busan (KR)

(73) Assignee: IUCF-HYU (INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 364 days.

(21) Appl. No.: 14/926,864

(22) Filed: Oct. 29, 2015

(65) Prior Publication Data

US 2016/0049650 A1    Feb. 18, 2016

Related U.S. Application Data

(63) Continuation of application No. PCT/KR2014/003808, filed on Apr. 29, 2014.

(30) Foreign Application Priority Data

Apr. 29, 2013 (KR) .......... 10-2013-0047797
Apr. 29, 2014 (KR) .......... 10-2014-0051935

(51) Int. Cl.
*H01M 4/36* (2006.01)
*H01M 4/38* (2006.01)
(Continued)

(52) U.S. Cl.
CPC .......... *H01M 4/366* (2013.01); *C01G 53/006* (2013.01); *C01G 53/50* (2013.01); *H01M 4/131* (2013.01);
(Continued)

(58) Field of Classification Search
None
See application file for complete search history.

(56) References Cited

FOREIGN PATENT DOCUMENTS

| KR | 20120079802 A | 7/2012 |
|----|---------------|--------|
| KR | 20130001703 A | 1/2013 |
| WO | 2014178624 A1 | 11/2014 |

OTHER PUBLICATIONS

Paulsen et al., Electrochemical and Solid-State Letters, 2007, 10(4), A101-A105.*

(Continued)

*Primary Examiner* — Barbara L Gilliam
*Assistant Examiner* — Zhongqing Wei
(74) *Attorney, Agent, or Firm* — Sughrue Mion, PLLC

(57) ABSTRACT

Embodiments of the inventive concepts described herein relate to a positive electrode active material for lithium secondary battery, and more particularly, relate to a positive electrode active material for a lithium secondary battery having a new structure which includes a core portion having gradients of concentrations of nickel, manganese, and cobalt in a direction from a center to a surface and in which each of the concentration gradients of nickel, manganese, and cobalt has at least one vertex in the core portion.

11 Claims, 3 Drawing Sheets

(51) Int. Cl.
    *H01M 4/134*     (2010.01)
    *H01M 10/0525*     (2010.01)
    *C01G 53/00*     (2006.01)
    *H01M 4/505*     (2010.01)
    *H01M 4/525*     (2010.01)
    *H01M 10/052*     (2010.01)
    *H01M 4/131*     (2010.01)
    *H01M 10/30*     (2006.01)
    *H01M 4/02*     (2006.01)

(52) U.S. Cl.
    CPC ............ *H01M 4/134* (2013.01); *H01M 4/38* (2013.01); *H01M 4/505* (2013.01); *H01M 4/525* (2013.01); *H01M 10/052* (2013.01); *H01M 10/0525* (2013.01); *C01P 2002/85* (2013.01); *C01P 2002/88* (2013.01); *C01P 2004/84* (2013.01); *H01M 10/30* (2013.01); *H01M 2004/027* (2013.01); *H01M 2004/028* (2013.01); *Y02T 10/7011* (2013.01)

(56) References Cited

OTHER PUBLICATIONS

Chen et al., "Advanced cathode materials for lithium-ion batteries", MRS Bulletin, 2011, vol. 36, pp. 499-505.

\* cited by examiner

POSITIVE ELECTRODE ACTIVE MATERIAL FOR LITHIUM SECONDARY BATTERY

CROSS-REFERENCE TO RELATED APPLICATIONS

This application is a continuation of International Application No. PCT/KR2014/003808 filed on Apr. 29, 2014, which claims priority from Korean Patent Application Nos. 10-2013-0047797 and 10-2014-0051935 filed with Korean Intellectual Property Office on Apr. 29, 2013 and Apr. 29, 2014, the entire contents of which are incorporated herein by reference.

BACKGROUND

1. Field of Disclosure

Embodiments of the inventive concepts described herein relate to a positive electrode active material for lithium secondary battery, and more particularly, relate to a positive electrode active material for lithium secondary battery which includes two core portions having gradients of concentrations of nickel, manganese, and cobalt in the direction from the center to the surface and in which the magnitudes of concentration gradients of nickel, manganese, and cobalt are controlled in the two core portions.

2. Description of the Related Art

A lithium secondary battery has an operating voltage of 3.7 V or more, and the demand for the lithium secondary battery as a power source for driving portable electronic information and communication devices is increasing day by day since the energy density per unit weight thereof is higher than a nickel-cadmium battery or a nickel-hydrogen battery.

In recent years, the study to hybridize an internal combustion engine and a lithium secondary battery as a power source for an electric vehicle has been actively carried out in US, Japan, Europe, and the like. A battery for plug-in hybrid (PHEV) used in a vehicle which has a travel distance of less than 60 miles a day is actively developed mainly in US. The battery for PHEV is a battery which has characteristics close to an electric vehicle, and thus it is a great task to develop a battery having a high capacity. In particular, it is the most important task to develop a positive electrode material which has a high tap density of 2.0 g/cc or more and a high capacity of 230 mAh/g or more.

The positive electrode material which has been currently commercialized or is being developed includes $LiCoO_2$, $LiNiO_2$, $LiMnO_2$, $LiMn_2O_4$, $Li_{1+x}[Mn_{2-x}M_x]O_4$, $LiFePO_4$, and the like. Among these, $LiCoO_2$ is an excellent material which has stable charge and discharge characteristics, excellent electron conductivity, a high battery voltage, high stability, and flat discharge voltage characteristics. However, Co is expensive and toxic to a human body and its reserves is little, and thus the development of another positive electrode material is desired. Moreover, the thermal characteristics of $LiCoO_2$ are significantly poor since its crystal structure is unstable due to delithiation during charge.

In order to improve this, it is attempted that the start temperature of heat generation is shifted to a higher temperature side by substituting some of Ni with transition metal elements or the exothermic peak is made broad so as to prevent a rapid heat generation. However, satisfactory results have not yet been obtained. In other words, the material $LiNi_{1-x}Co_xO_2$ (x=0.1-0.3) obtained by substituting some of Ni with Co exhibits excellent charge and discharge characteristics and cycle-life characteristics but the problem of thermal stability has not yet been solved. In addition, in European Patent No. 0872450, the material $Li_aCo_bMn_cM_dNi_{1-(b+c+d)}O_2$ (M=B, Al, Si. Fe, Cr, Cu, Zn, W, Ti, Ga) obtained by substituting some of Ni with other metals as well as Co and Mn is disclosed, but the thermal stability of the Ni-based material has not yet been solved.

In order to overcome such a disadvantage, a lithium transition metal oxide which has a concentration gradient of the metal composition has been proposed in Korea Patent Publication No. 2005-0083869. In this method, a material is produced in a double layer by once synthesizing an inner material having a certain composition and then covering it with a material having a different composition and then mixed with a lithium salt, and the mixture is subjected to the heat treatment. A commercially available lithium transition metal oxide may be used as the inner material.

In this method, however, the metal composition of the positive electrode active material discontinuously changes between the inner material and the outer material thus produced but not continuously and gradually changes. Moreover, the powder synthesized by this invention has a low tap density since ammonia of a chelating agent is not used therein, and thus it is not suitable for being used as a positive electrode active material for a lithium secondary battery.

In order to improve this point, in Korea Patent Publication No. 2007-0097923, a positive electrode active material which has an inner bulk portion and an outer bulk portion and a continuous concentration distribution of the metal components depending on the location in the outer bulk portion has been proposed. However, in this method, the concentration is constant in the inner bulk portion and the metal composition changes only in the outer bulk portion, and thus it is desired to develop a positive electrode active material having a new structure so as to exhibit excellent stability and to have a higher capacity.

SUMMARY

Embodiments of the inventive concepts provide a positive electrode active material having a new structure which includes a core portion having gradients of concentrations of nickel, manganese, and cobalt and in which the concentration gradients of nickel, manganese, and cobalt have a vertex in the core portion.

One aspect of embodiments of the inventive concept is directed to provide a positive electrode active material for lithium secondary battery which includes a core portion having concentration gradients of nickel, manganese, and cobalt in a direction from a center to a surface. Each of the concentration gradients of nickel, manganese, and cobalt has at least one vertex in the core portion.

In embodiments of the inventive concept, the fact that the concentration gradient has a vertex may mean that the concentration gradient has a vertex at which a negative value changes to a positive value or a positive value changes to a negative value. For example, the vertex may be a point at which the concentration of nickel which has increased in the direction from the center to the surface begins to decrease or may be a point at which the concentration of nickel which has decreased in the direction from the center to the surface begins to increase.

Alternatively, in embodiments of the inventive concept, the vertex may be a point at which the concentration which has had a (+) gradient begins to be constant. For example, the vertex may be a point at which the concentration of nickel which has increased in the direction from the center to the surface begins to be constantly maintained or may be a point at which the concentration of nickel which has decreased in the direction from the center to the surface begins to be constantly maintained.

In the positive electrode active material according to embodiments of the inventive concept, the core portion may include a first core portion having magnitudes of the concentration gradients of nickel, manganese, and cobalt which are represented by CS1-Ni, CS1-Mn, and CS1-Co, respectively; and a second core portion having magnitudes of the concentration gradients of nickel, manganese, and cobalt which are represented by CS2-Ni, CS2-Mn, CS2-Co, respectively. The magnitude CS1-Ni of the concentration gradient of nickel in the first core portion and the magnitude CS2-Ni of the concentration gradient of nickel in the second core portion may satisfy the following Equation.

(CS1-Ni)×(CS2-Ni)<0

In other words, in the positive electrode active material according to embodiments of the inventive concept, the magnitude of the concentration gradient of nickel in the second core portion may be controlled to be negative when the magnitude of the concentration gradient of nickel in the first core portion is positive, and the magnitude of the concentration gradient of nickel in the second core portion may be controlled to be positive when the magnitude of the concentration gradient of nickel in the first core portion is negative.

In the positive electrode active material according to embodiments of the inventive concept, the magnitude CS1-Mn of the concentration gradient of manganese in the first core portion and the magnitude CS2-Mn of the concentration gradient of manganese in the second core portion may satisfy the following Equation.

(CS1-Mn)×(CS2-Mn)<0

In other words, in the positive electrode active material according to embodiments of the inventive concept, the magnitude of the concentration gradient of manganese in the second core portion may be controlled to be negative when the magnitude of the concentration gradient of manganese in the first core portion is positive, and the magnitude of the concentration gradient of manganese in the second core portion may be controlled to be positive when the magnitude of the concentration gradient of manganese in the first core portion is negative.

In the positive electrode active material according to embodiments of the inventive concept, the magnitude CS1-Co of the concentration gradient of cobalt in the first core portion and the magnitude CS2-Co of the concentration gradient of cobalt in the second core portion may satisfy the following Equation.

(CS1-Co)×(CS2-Co)<0

In other words, in the positive electrode active material according to embodiments of the inventive concept, the magnitude of the concentration gradient of cobalt in the second core portion may be controlled to be negative when the magnitude of the concentration gradient of cobalt in the first core portion is positive, and the magnitude of the concentration gradient of cobalt in the second core portion may be controlled to be positive when the magnitude of the concentration gradient of cobalt in the first core portion is negative.

In the positive electrode active material according to embodiments of the inventive concept, the core portion may further include a first concentration-maintained portion having constant concentrations of nickel, manganese, and cobalt between the first core portion and the second core portion.

In the positive electrode active material according to embodiments of the inventive concept, the core portion may further include a second concentration-maintained portion having constant concentrations of nickel, manganese, and cobalt.

The positive electrode active material according to embodiments of the inventive concept may further include a shell portion having constant concentrations of nickel, manganese, and cobalt on an outer peripheral surface of the core portion.

In the positive electrode active material according to embodiments of the inventive concept, the shell portion may include a first shell portion having constant concentrations of nickel, manganese, and cobalt which are represented by SC1-Ni, SC1-Mn, and SC1-Co, respectively; and a second shell portion having constant concentrations of nickel, manganese, and cobalt which are represented by SC2-Ni, SC2-Mn, and SC2-Co, respectively.

In the positive electrode active material according to embodiments of the inventive concept, a volume of the shell portion may be 30% or less of a total volume.

Another aspect of embodiments of the inventive concept is directed to provide a lithium secondary battery including the positive electrode active material according to embodiments of the inventive concept.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
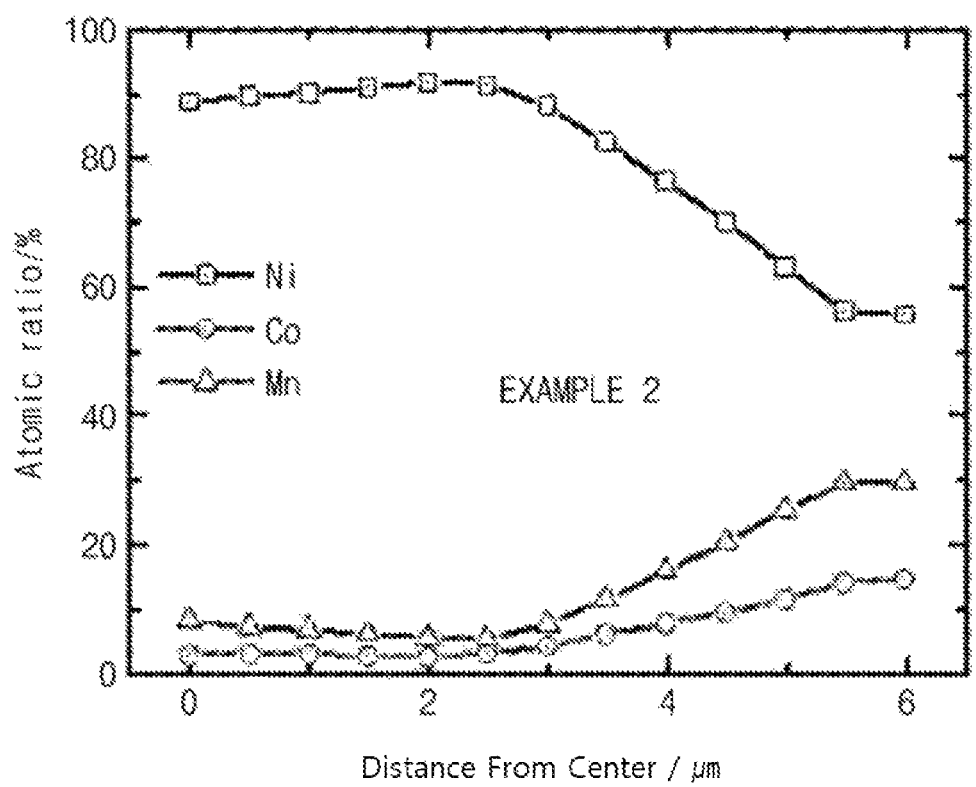
FIG. 1 illustrates the results of EDX measurement on the cross-section of the active materials produced in Example and Comparative Examples of the inventive concept.

Hereinafter, the inventive concept will be described in more detail with reference to Examples. However, the inventive concept is not limited by the following Examples.

Examples

Into a coprecipitation reactor (volume: 16 L, output of rotary motor: 80 W or more), 2.5 L of distilled water was introduced, $N_2$ gas was then supplied thereto at a rate of 2 L/min, and the distilled water was stirred at 400 rpm while maintaining the temperature of the reactor at 45° C.

A first aqueous metal ion solution prepared by mixing nickel sulfate, cobalt sulfate, and manganese sulfate so as to have a composition of $Ni_{x1}Co_{y1}Mn_{z1}(OH)_2$ (x1, y1, and z1 are mol % of Ni, Co, and Mn in the first aqueous metal ion solution, respectively) and a second aqueous metal ion solution prepared by mixing nickel sulfate, cobalt sulfate, and manganese sulfate so as to have a composition of $Ni_{x2}Co_{y2}Mn_{z2}(OH)_2$ (x2, y2, and z2 are mol % of Ni, Co, and Mn in the second aqueous metal ion solution, respectively) were continuously introduced into the reactor at 0.7 L/hr while mixing them and changing the mixing ratio for volume of the second aqueous metal ion solution to the first aqueous metal ion solution from 0 to 100, and an ammonia solution having a concentration of 25 M was also continuously introduced into the reactor at 0.7 L/hr, thereby forming a core portion having a concentration gradient. In addition, a sodium hydroxide solution having a concentration of 5 M was supplied into the reactor in order to adjust the pH so that the pH was maintained at 11.5. The speed of impeller was controlled at 400 rpm.

A third aqueous metal ion solution prepared by mixing nickel sulfate, cobalt sulfate, and manganese sulfate so as to have constant concentrations of $Ni_{x3}Co_{y3}Mn_{z3}(OH)_2$(x3, y3, and z3 are mol % of Ni, Co, and Mn in the third aqueous metal ion solution, respectively) was supplied into the reactor while mixing them and changing the mixing ratio for volume of the third aqueous metal ion solution to the second aqueous metal ion solution from 0 to 100, thereby forming a second core portion. After the second core portion having a desired thickness was formed, only the third aqueous metal ion solution was supplied into the reactor to form a shell portion having a constant concentration that was the same as the final concentration of the second core portion, thereby producing a composite metal hydroxide.

The concentrations (atomic ratio % of Ni, Co or Mn) of the aqueous metal solutions in Examples 1 to 3 are as presented in the following Table 1.

TABLE 1

|  | First aqueous metal solution | | | Second aqueous metal solution | | | Third aqueous metal solution | | | Thickness of shell |
| --- | --- | --- | --- | --- | --- | --- | --- | --- | --- | --- |
|  | Ni | Co | Mn | Ni | Co | Mn | Ni | Co | Mn |  |
| Example 1 | 75 | 5 | 20 | 90 | 7 | 3 | 65 | 10 | 25 | 0.5 μm |
| Example 2 | 86 | 0 | 14 | 96 | 0 | 4 | 54 | 15 | 31 | 0.4 μm |
| Example 3 | 80 | 10 | 10 | 95 | 2 | 3 | 45 | 20 | 35 | 0.3 μm |

The composite metal hydroxide thus produced was filtered, washed with water, and then dried for 12 hours in a hot air dryer at 110° C. The composite metal hydroxide and lithium hydroxide (LiOH) were mixed at a molar ratio of 1:1, the mixture was subjected to the preliminary firing by heating at a temperature rise rate of 2° C./min and then maintaining at 450° C. for 10 hours and then fired at from 700 to 900° C. for 10 hours, thereby obtaining a positive electrode active material powder.

Examples

The first core portion was formed in the same manner as in Examples above, the second core portion was then formed by mixing the third aqueous metal ion solution and the second aqueous metal ion solution while changing the mixing ratio for volume thereof, and only a fourth aqueous metal ion solution prepared by mixing nickel sulfate, cobalt sulfate, and manganese sulfate so as to have constant concentrations of $Ni_{x4}Co_{y4}Mn_{z4}(OH)_2$(x4, y4, and z4 are mol % of Ni, Co, and Mn in the fourth aqueous metal ion solution, respectively) was supplied into the reactor to form the shell portion.

The concentrations (atomic ratio % of Ni, Co or Mn) of the aqueous metal solutions prepared in Examples 4 and 5 are as presented in the following Table 2.

TABLE 2

|  | First aqueous metal solution | | | Second aqueous metal solution | | | Third aqueous metal solution | | | Fourth aqueous metal solution | | | Thickness of shell |
| --- | --- | --- | --- | --- | --- | --- | --- | --- | --- | --- | --- | --- | --- |
|  | Ni | Co | Mn | Ni | Co | Mn | Ni | Co | Mn | Ni | Co | Mn |  |
| Example 4 | 80 | 5 | 15 | 90 | 5 | 5 | 50 | 20 | 30 | 40 | 20 | 40 | 0.5 μm |
| Example 5 | 75 | 10 | 15 | 95 | 2 | 3 | 65 | 15 | 20 | 55 | 15 | 30 | 0.3 μm |

The composite metal hydroxide thus produced was filtered, washed with water, and then dried for 12 hours in a hot air dryer at 110° C. The composite metal hydroxide and lithium hydroxide (LiOH) were mixed at a molar ratio of 1:1, the mixture was subjected to the preliminary firing by heating at a temperature rise rate of 2° C./min and then maintaining at 450° C. for 10 hours and then fired at from 700 to 900° C. for 10 hours, thereby obtaining a positive electrode active material powder.

Comparative Examples

In Comparative Example 1, particles having a constant concentration in the entire particle were produced by supplying an aqueous metal ion solution having a composition represented by $Ni_{70}Co_9Mn_{21}OH_2$ which corresponds to the average composition of the entire particle in Example 2.

In Comparative Example 2, particles were produced in the same manner as in Example 2 except that the first core portion was not formed in Example 2.

In Comparative Example 3, particles having a constant concentration in the entire particle were produced by supplying an aqueous metal ion solution having a composition represented by $Ni_{60}Co_{15}Mn_{25}OH_2$ which corresponds to the average composition of the entire particle in Example 4.

<Experimental Example> Taking of EDX Image

The concentrations of Ni, Mn, and Co depending on the distance from the center in the particles produced in Example 2 were measured by EDX, and the results are illustrated in FIG. 1.

From FIG. 1, it has been confirmed that the magnitudes of the concentration gradients of the metals in the first core portion and the magnitudes of the concentration gradients of the metals in the second core portion are reversed in the case of the particles according to Example of the inventive concept.

<Experimental Example> Measurement of Charge and Discharge Characteristics, Cycle-Life Characteristics, and DSC The charge and discharge characteristics, cycle-life characteristics, and DSC characteristics of the batteries which included the active materials produced in Examples 1 to 5 and Comparative Examples 1 to 3 were measured, and the results are presented in the following Table 3 and illustrated in FIGS. 2 and 3.

TABLE 3

| | Discharge characteristics | Cycle-Life characteristics ($100^{th}$) | DSC |
|---|---|---|---|
| Example 1 | 208.3 mAh/g | 94.7% | 273.5° C. |
| Example 2 | 199.7 mAh/g | 95.0% | 280.7° C. |
| Example 3 | 194.8 mAh/g | 95.6% | 288.9° C. |
| Example 4 | 187.6 mAh/g | 96.3% | 296.3° C. |
| Example 5 | 205.9 mAh/g | 95.2% | 281.6° C. |
| Comparative Example 1 | 185.3 mAh/g | 88.2% | 268.2° C. |
| Comparative Example 2 | 195.9 mAh/g | 95.2% | 283.5° C. |
| Comparative Example 3 | 178.7 mAh/g | 91.2% | 267.6° C. |

Figure 2:
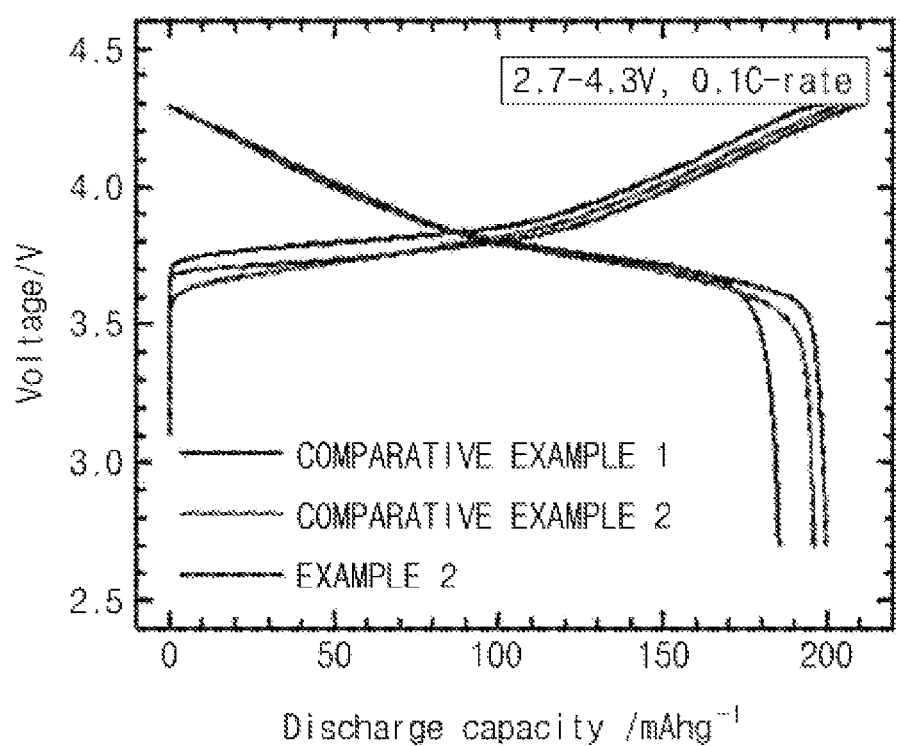
FIGS. 2 and 3 illustrate the results of charge and discharge characteristics and cycle-life characteristics measured on the batteries which include the active materials produced in Example and Comparative Examples of the inventive concept.
Figure 3:
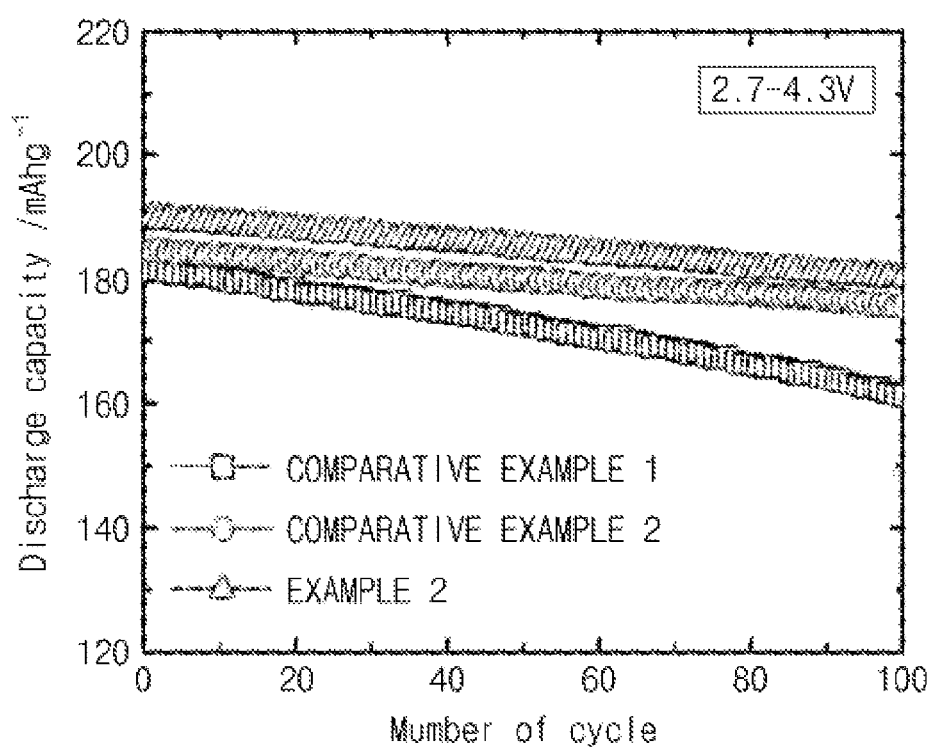

In FIGS. 2 and 3, it has been confirmed that the capacity and the cycle-life characteristics until $100^{th}$ cycle are greatly improved in the active materials produced in Examples of the inventive concept as compared to the active materials produced in Comparative Examples.

The positive electrode active material according to embodiments of the inventive concept exhibits excellent cycle-life characteristics and excellent charge and discharge characteristics as the magnitudes of concentration gradients of nickel, manganese, and cobalt are controlled in two core portions having the concentration gradients, and thus the positive electrode active material has a stabilized crystal structure as well as a high capacity and is structurally stabilized even when being used at a high voltage.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A positive electrode active material for lithium secondary battery, the positive electrode active material comprising:
    a core portion having nickel, manganese, and cobalt, and concentration gradients of the nickel, manganese, and cobalt in a direction from a center to a surface,
    wherein a profile of each concentration gradient of the nickel, manganese, and cobalt has at least one vertex in the core portion,
    wherein the vertexes of the nickel, manganese and cobalt are provided at the same distance from the center,
    wherein the concentration gradients of the nickel and manganese from the center to the vertexes are constant, wherein a concentration of nickel is increased from the center to the vertex, and a concentration of manganese is decreased from the center to the vertex,
    wherein the concentration of nickel in the core portion is higher than the concentration of manganese in the core portion, and
    wherein the concentration of nickel in the core portion is higher than the concentration of cobalt in the core portion.

2. The positive electrode active material of claim 1, wherein the core portion comprises:
    a first core portion having magnitudes of the concentration gradients of nickel, manganese, and cobalt which are represented by CS1-Ni, CS1-Mn, and CS1-Co, respectively; and
    a second core portion having magnitudes of the concentration gradients of nickel, manganese, and cobalt which are represented by CS2-Ni, CS2-Mn, CS2-Co, respectively, and
    wherein the magnitude CS1-Ni of the concentration gradient of nickel in the first core portion and the magnitude CS2-Ni of the concentration gradient of nickel in the second core portion satisfy the following Equation
    (CS1-Ni)×(CS2-Ni)<0.

3. The positive electrode active material of claim 2, wherein the magnitude CS1-Mn of the concentration gradient of manganese in the first core portion and the magnitude CS2-Mn of the concentration gradient of manganese in the second core portion satisfy the following Equation
    (CS1-Mn)×(CS2-Mn)<0.

4. The positive electrode active material of claim 2, wherein the magnitude CS1-Co of the concentration gradient of cobalt in the first core portion and the magnitude CS2-Co of the concentration gradient of cobalt in the second core portion satisfy the following Equation
    (CS1-Co)×(CS2-Co)<0.

5. The positive electrode active material of claim 2, wherein the core portion further comprises: a first concentration-maintained portion having constant concentrations of nickel, manganese, and cobalt between the first core portion and the second core portion.

6. The positive electrode active material of claim 2, wherein the core portion further comprises: a second concentration-maintained portion having constant concentrations of nickel, manganese, and cobalt,
    wherein the second concentration-maintained portion is surrounded by the first core portion.

7. The positive electrode active material of claim 1, further comprising: a shell portion having constant concentrations of nickel, manganese, and cobalt on an outer peripheral surface of the core portion.

8. The positive electrode active material of claim 7, wherein the shell portion comprises:
    a first shell portion having constant concentrations of nickel, manganese, and cobalt which are represented by SC1-Ni, SC1-Mn, and SC1-Co, respectively; and
    a second shell portion having constant concentrations of nickel, manganese, and cobalt which are represented by SC2-Ni, SC2-Mn, and SC2-Co, respectively.

9. The positive electrode active material of claim 7, wherein a volume of the shell portion is 30% or less of a total volume of the shell portion and the core portion.

10. A lithium secondary battery comprising the positive electrode active material of claim 1.

11. The positive electrode active material of claim 2, wherein CS2-Ni is larger than CS1-Ni, CS2-Mn is larger than CS1-Mn, and CS2-Co is larger than CS1-Co, and wherein the second core portion is thicker than the first core portion.

* * * * *